(12) United States Patent
Bastedo

(10) Patent No.: US 10,676,280 B1
(45) Date of Patent: Jun. 9, 2020

(54) CORRUGATED PIPE CARRIER

(71) Applicant: Rodney Bastedo, Orange, CT (US)

(72) Inventor: Rodney Bastedo, Orange, CT (US)

( * ) Notice: Subject to any disclaimer, the term of this patent is extended or adjusted under 35 U.S.C. 154(b) by 0 days.

(21) Appl. No.: 16/412,323

(22) Filed: May 14, 2019

Related U.S. Application Data

(60) Provisional application No. 62/799,083, filed on Jan. 31, 2019, provisional application No. 62/674,734, filed on May 22, 2018.

(51) Int. Cl.
*B65G 7/12* (2006.01)
*F16L 3/02* (2006.01)

(52) U.S. Cl.
CPC ............... *B65G 7/12* (2013.01); *F16L 3/02* (2013.01); *B65G 2201/0276* (2013.01)

(58) Field of Classification Search
CPC .. B65G 7/12; B65G 2201/0276; A62C 33/04; F16L 3/003; F16L 3/02
USPC .......................................... 294/15, 145, 170
See application file for complete search history.

(56) References Cited

U.S. PATENT DOCUMENTS

| | | | | |
|---|---|---|---|---|
| 730,119 | A * | 6/1903 | Hanson et al. | |
| 877,012 | A * | 1/1908 | Sullivan | |
| 1,058,926 | A * | 4/1913 | Toole | B65G 7/12 294/16 |
| 1,686,115 | A * | 10/1928 | Anderson | A01G 25/00 294/15 |
| 1,817,233 | A * | 8/1931 | Bumgardner | E21B 19/00 294/92 |
| 2,007,039 | A * | 7/1935 | Dickson | A45F 5/102 294/159 |
| 2,671,684 | A * | 3/1954 | Giroux | B61G 7/02 294/18 |
| 3,056,571 | A * | 10/1962 | Schofield | A62C 33/04 248/75 |
| 4,470,177 | A * | 9/1984 | Ganung | A62C 33/04 24/270 |
| 4,575,142 | A | 3/1986 | Parker | 294/19.1 |
| 4,655,492 | A | 4/1987 | Landry | 294/15 |
| 4,838,315 | A | 6/1989 | Gunn | 137/899.3 |
| 4,856,834 | A * | 8/1989 | Lancaster | B65G 7/12 294/15 |
| 6,851,732 | B2 * | 2/2005 | Fiesler | B65G 7/12 294/16 |
| 7,070,218 | B2 | 7/2006 | Bercaw et al. | 294/15 |
| 8,893,355 | B2 | 11/2014 | Longley et al. | 16/426 |

(Continued)

OTHER PUBLICATIONS www.gardenersedge.com; The Original Hose Handle; 1 page.

*Primary Examiner* — Dean J Kramer
(74) *Attorney, Agent, or Firm* — Fattibene and Fattibene LLC; Paul A. Fattibene

(57) ABSTRACT

A carrying device for attaching to and aiding the carrying and placement of corrugated pipe. A handle is attached to a spine having a curved grip with raised surfaces attached to each opposing end of the spine. Each of the curved grips has an open portion facing each other configured to hold a corrugated pipe. Attachments may be attached to the carrying device. A perpendicular handle may be attached providing easier carrying. Stabilizing legs may be attached providing stability when placed on the ground. A telescoping handle may be attached providing remote attachment. Carrying large cumbersome corrugated pipe is made secure and easy.

4 Claims, 16 Drawing Sheets

(56) References Cited

U.S. PATENT DOCUMENTS 9,700,471 B2 * 7/2017 Nakamura ............. A61G 5/003
2014/0232123 A1 * 8/2014 Lavelle ................. F16L 3/1215
294/137

* cited by examiner

CORRUGATED PIPE CARRIER

RELATED APPLICATIONS

This application claims the benefit of U.S. Provisional Application No. 62/799,083 filed Jan. 31, 2019 and U.S. Provisional Application No. 62/674,734 filed May 22, 2018, both of which are herein incorporated by reference.

FIELD OF THE INVENTION

The present invention relates in general to a device for easily carrying a pipe, and particularly to a device for carrying a corrugated pipe.

BACKGROUND OF THE INVENTION

Large corrugated pipe is generally difficult to carry and position. The corrugated pipe often has a large diameter that is difficult to grasp with one hand. The corrugated pipe is also often long and may be difficult to rotate into a desired position.

Prior devices have been used to hold small hoses. One such device has been sold as "The Original Hose Handle" by Gardener's Edge. The hose handle snaps easily onto a garden hose and allows the hose to effortlessly glide through the hose handle as the garden hose is wound. This prevents the user's hands from becoming dirty. However, this device for aiding winding of small hoses is not suited to hold or carry larger heavier pipe.

Another hose gripper for holding high pressure hose is disclosed ion U.S. Pat. No. 4,655,492 issuing to Landry on Apr. 7, 1987. Therein disclosed is a saddle with offset opposed curved jaws and a vertical handle. Yet another device for releasable gripping a hose is disclosed in U.S. Pat. No. 7,070,218 issuing to Bercaw et al on Jul. 4, 2006. Therein disclosed is a transversal member medially and contiguously disposed of two matching engaging members. The position along the hose is changed by rotatably relieving an abutable contact with the hose by pivoting a handle.

Devices have also been used to hold implements having collars. The collars being configured to releasable receive a shaft of the implement. One such device is disclosed in U.S. Pat. No. 8,893,355 issuing to Longley et al. on Nov. 25, 2014. Therein disclosed is a turn collar fulcrum handle for attaching to a shaft of an implement. Opposing collars receive the shaft of the implement. The turn collar fulcrum handle provides a fulcrum reducing lifting effort of a load.

While these prior devices have been useful for their specialized purposes, they are not well adapted or suitable to lifting and positioning of large corrugated pipe. Therefore, there is a need for a device that will make lifting and positioning of large corrugated pipe easier and simpler for a single individual.

SUMMARY OF THE INVENTION

The present invention is a device for carrying corrugated pipe. A handle is attached to a bridge or spine. A curved grip having an open portion is attached to each end of the bridge or spine. The curved grips are attached to the bridge or spine having their open portions facing each other. Each of the curved grips have raised surfaces adapted to mate with grooves of a corrugated pipe.

In another embodiment of the invention a corrugated pipe carrier has a separate handle and bridge or spine attached between each of the first and second curved grips for gripping the corrugated pipe. The bridge has a threaded hole for attachments. The attachments may be a perpendicular handle for assisting carrying or legs for stabilizing the corrugated pipe carrier when placed on the ground. Additionally, a telescoping handle may be attached to the corrugated pipe carrier.

It is an object of the present invention to make carrying large corrugated pipe easier.

It is a further object of the present invention to easily position the corrugated pipe into a desired position.

It is an advantage of the present invention that corrugated pipe can be carried with one hand.

It is another advantage of the present invention that once attached to corrugated pipe the corrugated pipe does not move relative to the present invention providing improved control over the corrugated pipe.

It is yet another advantage of the present invention that large corrugated pipe can easily be attached to the present invention.

It is a feature of the present invention that two curved grips having opposing open ends are attached to each end of a bridge attached to a handle.

It is another feature of the present invention that each of the curved grips have raised surfaces adapted to mate with grooves in a corrugated pipe.

It is an object of an embodiment of the present invention to provide easier carrying of a corrugated pipe by more than one person.

It is a further object of an embodiment of the present invention to remotely and securely grasp a corrugated pipe.

It is an advantage of an embodiment of the present invention that it may be placed on the ground without tipping.

It is a feature of an embodiment of the present invention that a stand is attached.

It is a feature of an embodiment of the present invention that it may be remotely positioned with an extended handle.

These and other objects, advantages, and features will become more apparent in view of the following detailed description.

DETAILED DESCRIPTION OF THE PREFERRED EMBODIMENTS

Figure 1:
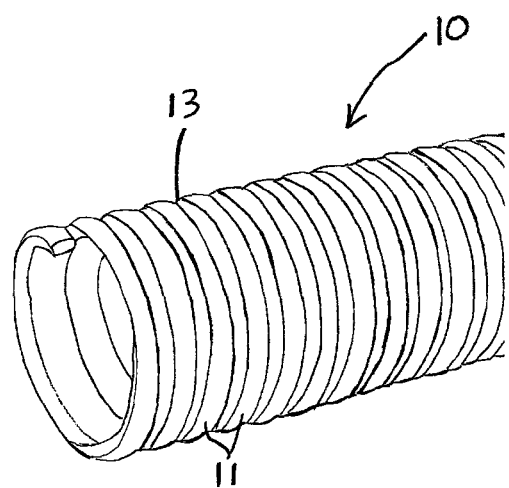
FIG. 1 is a perspective view of a corrugated pipe.

FIG. 1 illustrates a corrugated pipe 10 having ridges 11 and grooves 13. The corrugated pipe 10 usually has a relatively large outside diameter of between three and nine inches and often comes in long sections. Smaller or larger outside diameter pipe may also be used.

Figure 2:
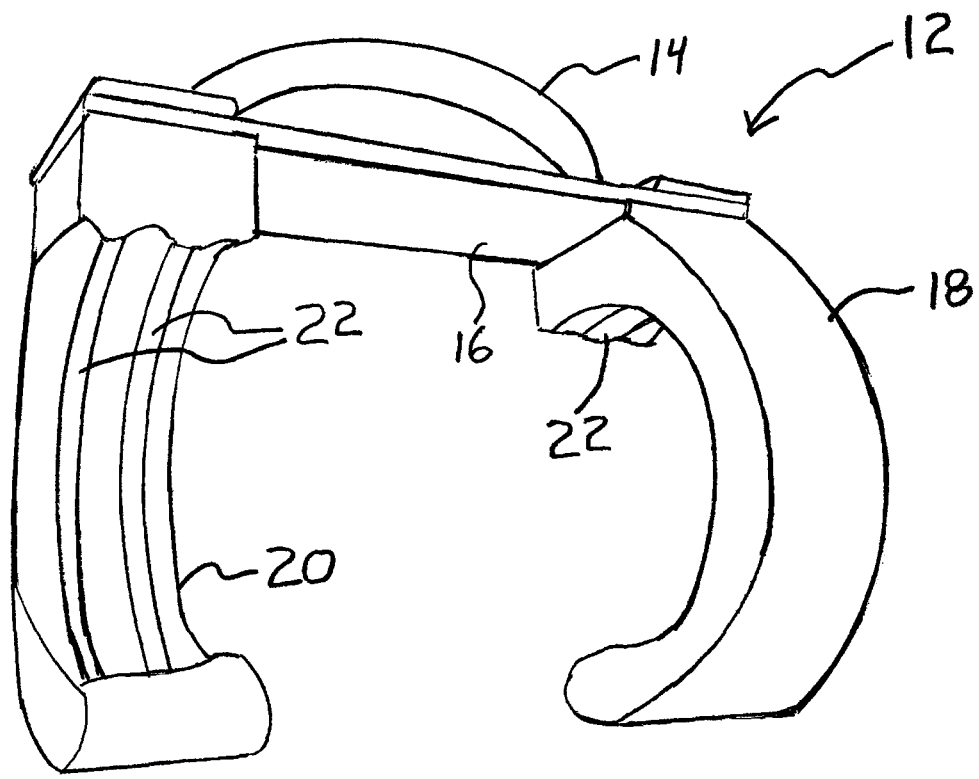
FIG. 2 is a perspective view of an embodiment of the present invention.
Figure 3:
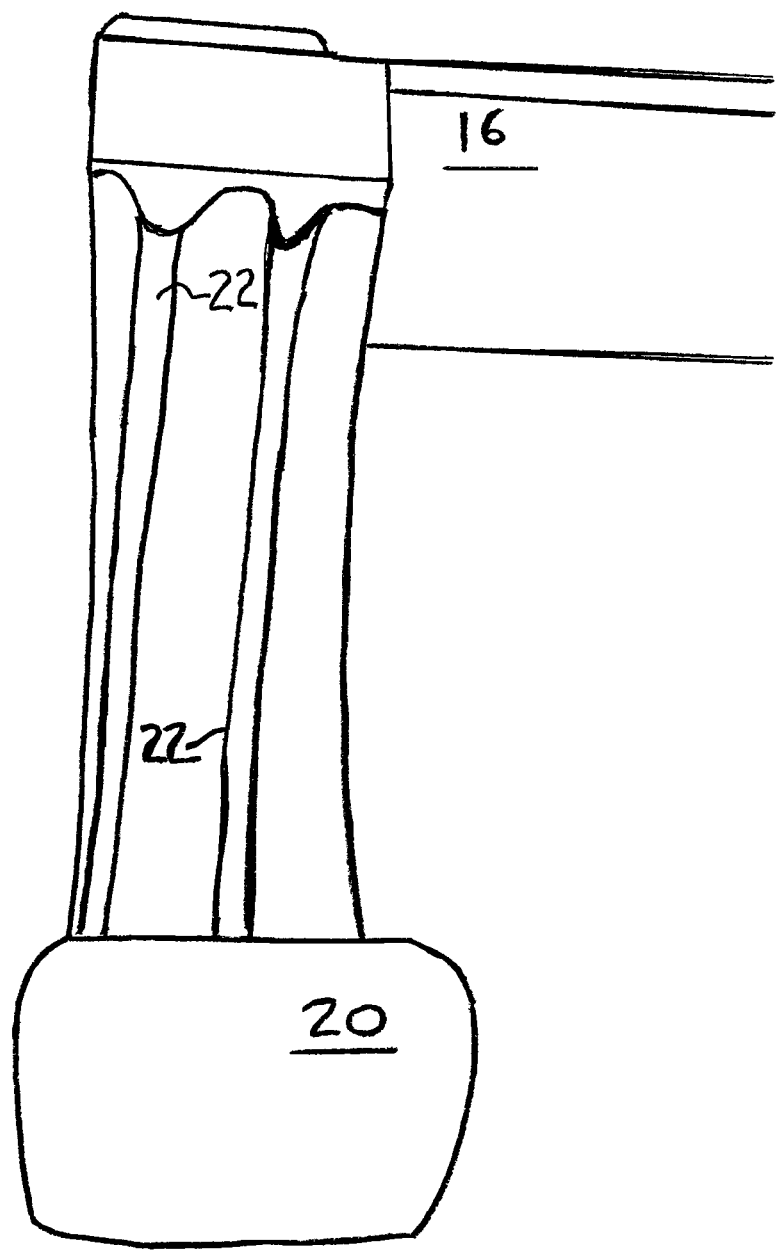
FIG. 3 is an elevational view illustrating one of the curved grips and the raised surfaces adapted to mate with groves in the corrugated pipe.

FIG. 2 illustrates a prototype of the present invention. The corrugated pipe carrier 12 comprises a handle 14 attached to a bridge or spine 16. At opposing ends of the bridge or spine 16 are a first curved grip 18 and a second curved grip 20. The first and second curved grips 18 and 20 each have an opening or open end and are positioned on the bridge or spine 16 so that their open ends face each other. On each curved grip are raised surfaces 22. The raised surfaces 22 are adapted, sized, or configured to mate with the groves 13 between the ridges 11 formed on the corrugated pipe 10, illustrated in FIG. 1. This permits the corrugated pipe carrier 12 to hold the corrugated pipe 10 securely and without the corrugated pipe 10 slipping or moving relative to the corrugated pipe carrier 12. This permits a single individual to pick-up, move, and position the relatively large corrugated pipe 10 easily.

In operation and to attach the corrugated pipe 10, the corrugated pipe carrier 12 is positioned over the corrugated pipe 10 so that the longitudinal axis of the bridge or spine 16 is substantially perpendicular to the longitudinal axis of the corrugated pipe 10. The corrugated pipe 10 is positioned between the first and second curved grips 18 and 20. The handle 14 and the attached bridge or spine 16 are then rotated so that the corrugated pipe 10 is placed within each of the opened ends of the first and second curved grips 18 and 20. When the corrugated pipe carrier 12 is in the carrying position, the longitudinal axis of the handle and attached bridge or spine 16 is parallel to the longitudinal axis of the corrugated pipe 10. The raised surfaces 22 formed within the inner surface of the first and second curved grips are adapted or configured to mate securely with the grooves 13 of the corrugated pipe 10. With the inner surface of the first and second curved grips 18, 20 mating with the external surface of the corrugated pipe 10, the corrugated pipe 10 is securely held within the corrugated pipe carrier 12. The corrugated pipe 10 is easily removed from the corrugated pipe carrier 12 by reversing the attachment method. That is by rotating the handle 14 so that the longitudinal axis of the base or spine 16 is substantially perpendicular to the longitudinal axis of the corrugated pipe 10. The handle 14 can them be easily lifted off of corrugated pipe 10.

It should be appreciated that other types of pipes having different surfaces may be securely held. Other types of pipes may be held as long as the inner curved surface of the first and second curved grips are adapted or configured to mate securely with an exterior surface of the pipe to be held. The mating of the inner surface of the first and second curved grips 18, 20 and the external surface of the corrugated pipe 10 assures that the corrugated pipe 10 does not move longitudinally or axially relative to the corrugated pipe carrier 12. This greatly facilitates carrying and positioning of the corrugated pipe 10.

Figure 4:
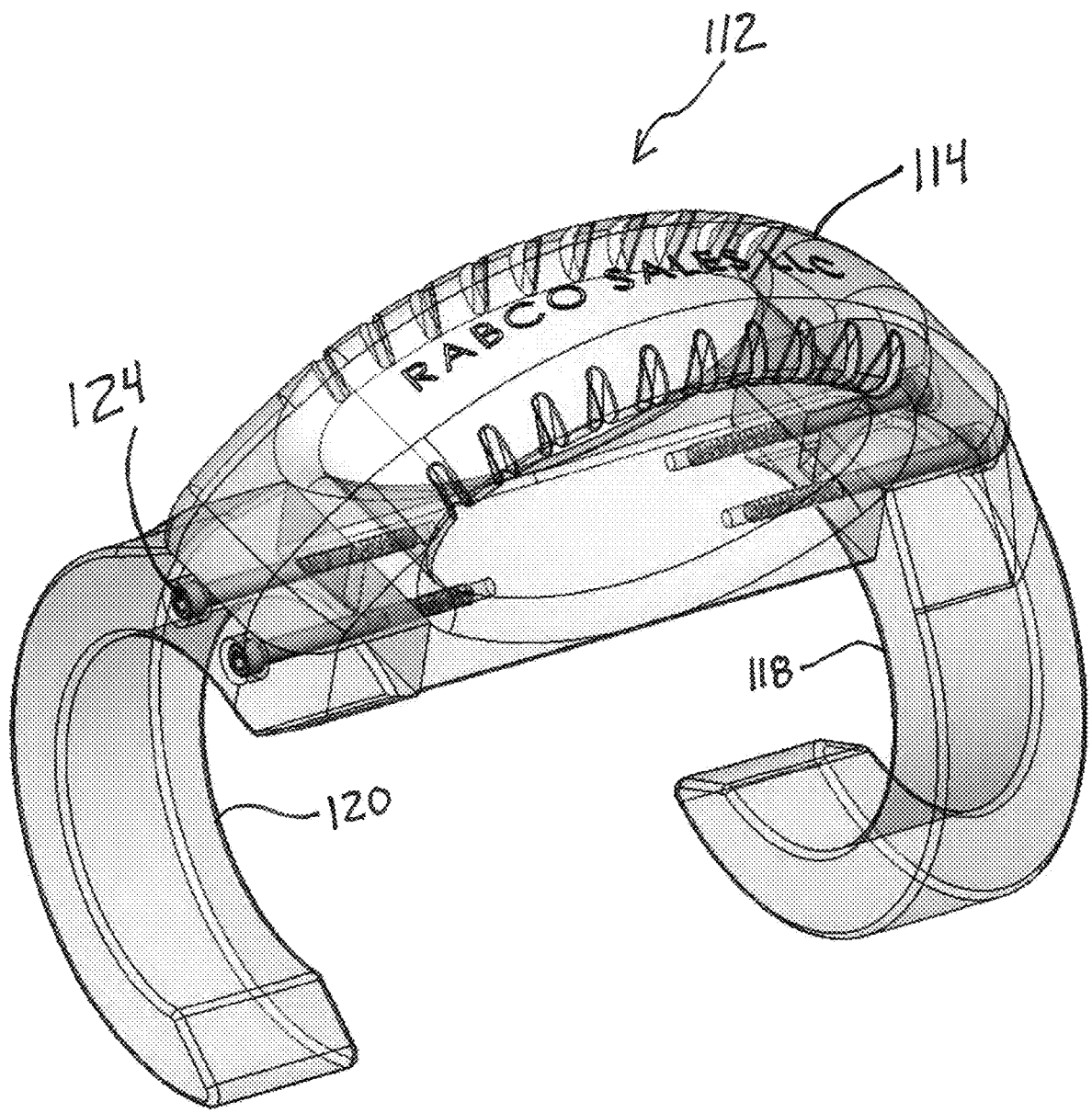
FIG. 4 is a perspective semi-transparent view schematically illustrating the construction of another embodiment of the present invention.

FIG. 4 illustrates the construction of a pipe carrier 112 of another embodiment of the present invention. In this embodiment a shaped handle 114 includes an integral bridge. First and second curved grips 118 and 120 are attached to the handle 114 with fasteners or screws 124.

Figure 5:
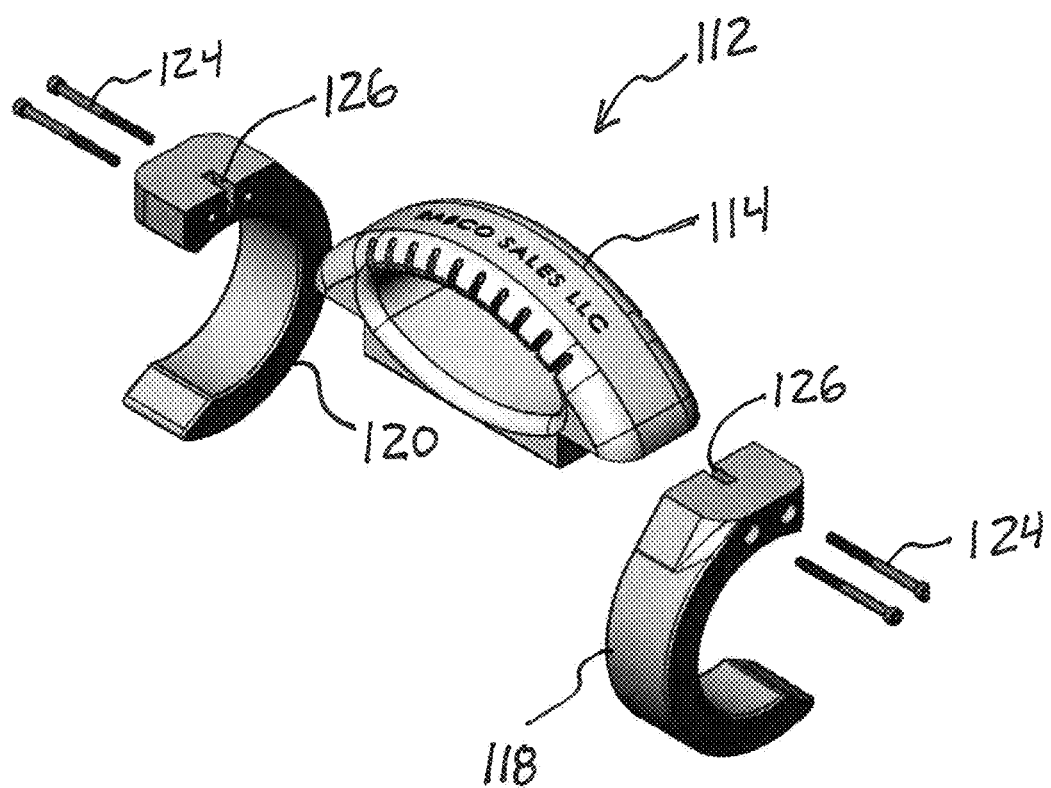
FIG. 5 is a top perspective exploded view illustrating the assembled structure of the present invention illustrated in FIG. 4.
Figure 6:
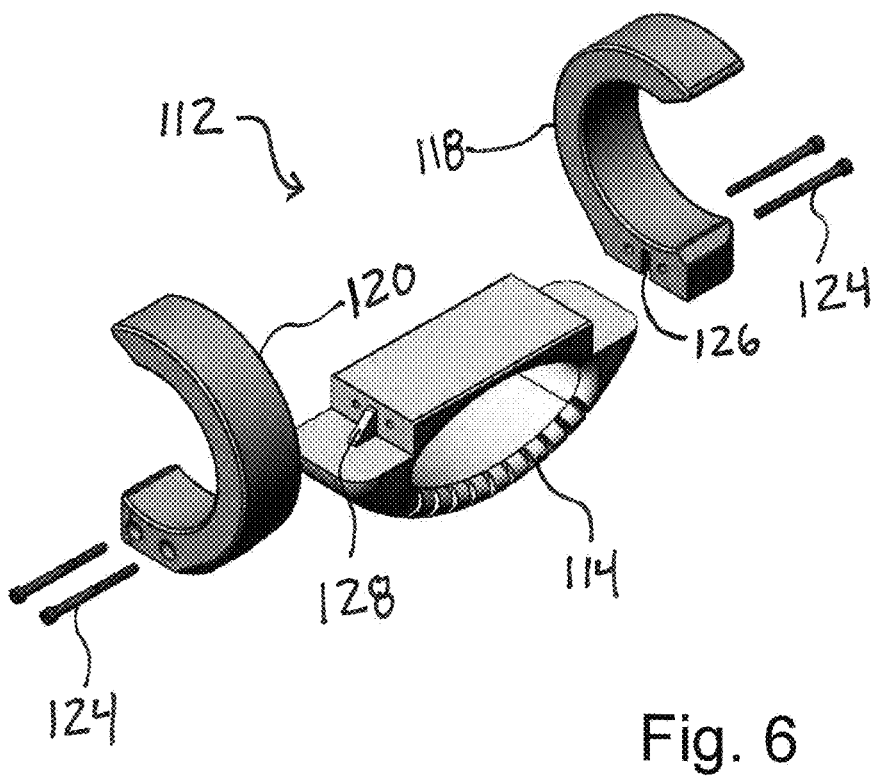
FIG. 6 is a bottom perspective exploded view illustrating the assembled structure of the present invention illustrated in FIG. 4.

FIGS. 5-6 more clearly illustrate the assembly or construction of the pipe carrier 112 illustrated in FIG. 4. The curved grips 118 and 120 fit within a cutout formed in each end of the handle 114. The curved grips 118 and 120 each have a slot 126 formed therein. The slot 126 mates with a corresponding tab 128 formed on the cutout in each end of the handle 114. The slot 126 and the tab 128 aid in the alignment and assembly of the handle 114 and the curved grips 118 and 120.

Figure 7:
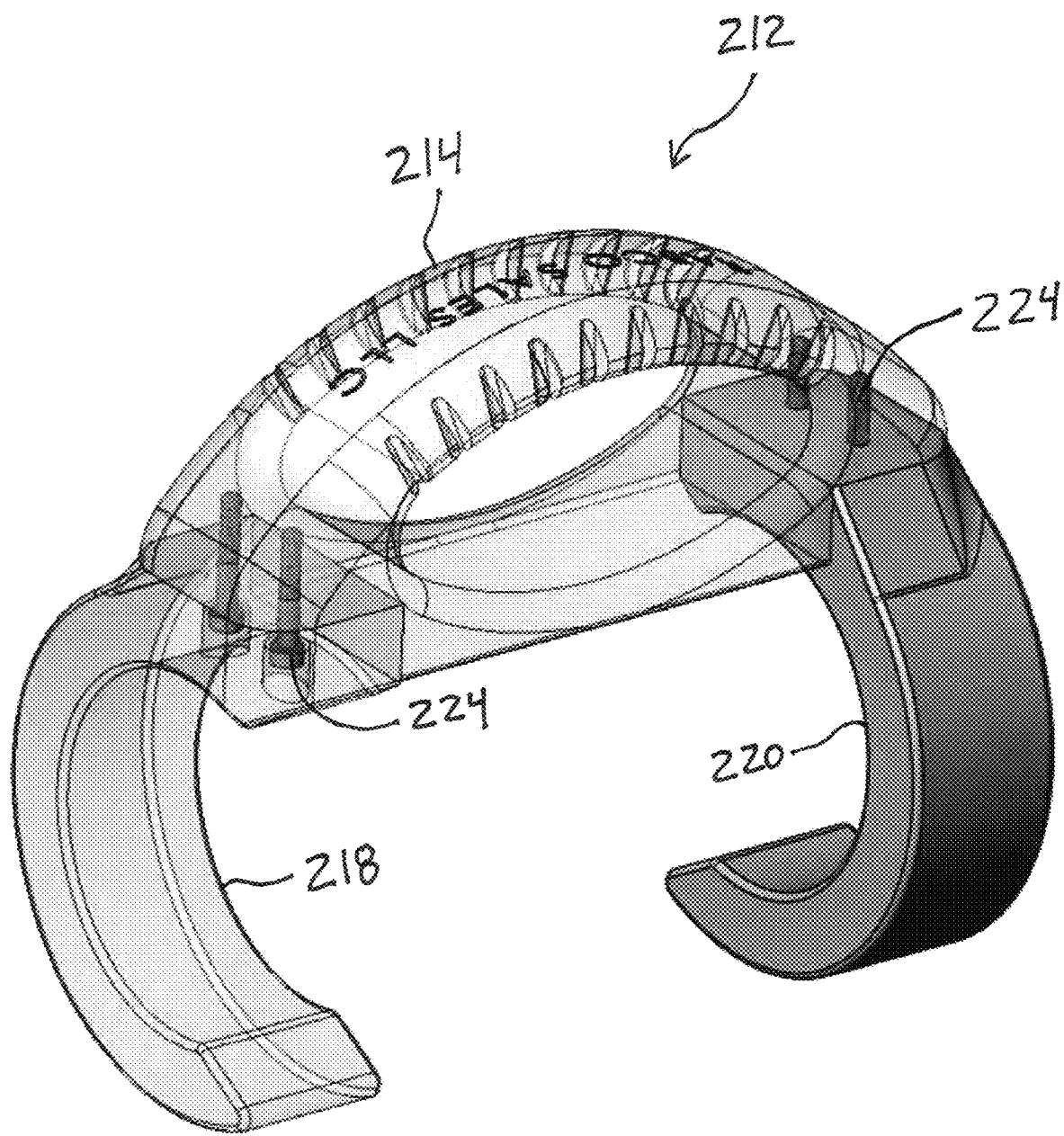
FIG. 7 is a perspective semi-transparent view schematically illustrating the construction of another embodiment of the present invention.

FIG. 7 illustrates the construction of a pipe carrier 212 of another embodiment of the present invention. In this embodiment the first and second curved grips 218 and 220 are attached to the handle 214 with fasteners 224 that extend from the inner surface of the first and second curved grips 218 and 220 into the handle. This hides the screws from being visible from the side of the pipe carrier 214.

The first and second curved grips illustrated in FIGS. 4-7 may have an inner surface that has a shape or contour that mates with a shape or contour of the pipe intended to be carried and positioned. This permits the pipe to be securely held within the first and second curved grips and prevents longitudinal or axial movement of the pipe relative to the pipe carrier. This greatly facilitates control over the pipe during movement and placing the pipe into position. Additionally, the first and second curved grips may have open ends that have an opening that spans less than one-hundred and eight degrees so that a distal end of the first and second curved grips is capable of snapping onto or over the diameter of the corrugated pipe providing a secure attachment. The first and second curved grips are preferably made of a plastic rigid enough to securely hold the pipe, yet flexible enough to snap over the diameter of the pipe when placed in position.

FIGS. 8-18 illustrate an embodiment of the present invention that permits the corrugated pipe carrier to have different attachments. The handle attachment provides easier carrying of the corrugated pipe carrier and corrugated pipe. A stand attachment provides the corrugated pipe carrier to be placed on the ground without tipping. An extension handle provides remote grasping of the corrugated pipe.

Figure 8:
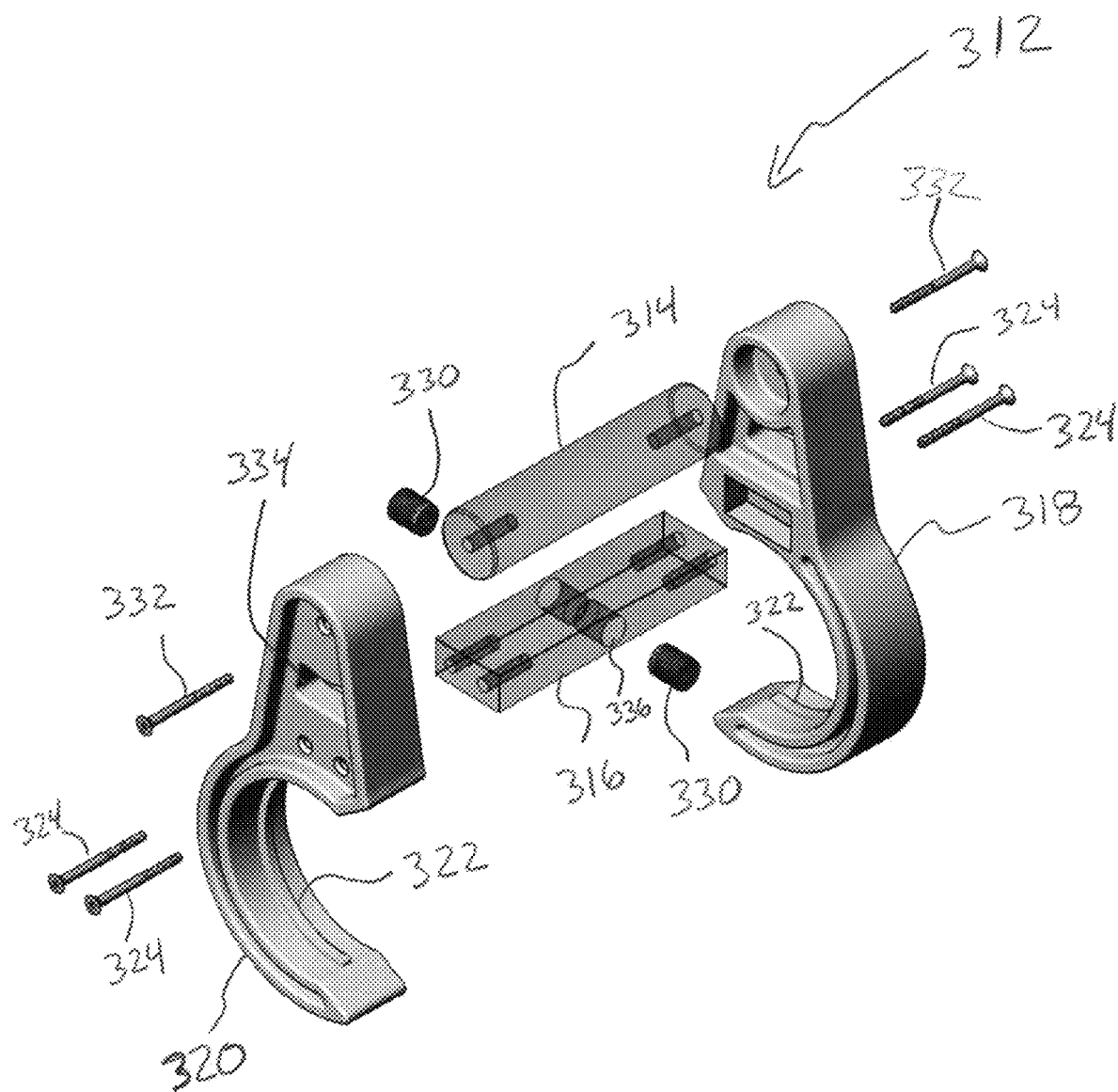
FIG. 8 is a perspective exploded view of another embodiment of a corrugated pipe carrier.

FIG. 8 illustrates the corrugated pipe carrier 312 having a parallel handle 314 and a bridge or spine 316. The handle 314 and the bridge 316 are placed between a first curved grip 318 and a second curved grip 320. Each of the first and the second curved grips 318 and 320 have raised surfaces or ridges 322 that mate with the grooves on a corrugated pipe. The handle 314 is attached to each of the first and second curved grips 318 and 320 by screws 332. The bridge 316 is attached between the first and second curved grips 318 and 320 with screws 324. The bridge 316 has threaded holes 336 on either side. A plug 330 may be placed in the threaded holes 336 to protect them prior to installing an attachment. An opening 334 is formed in each of the first and second curved grips 318 and 320.

Figure 9:
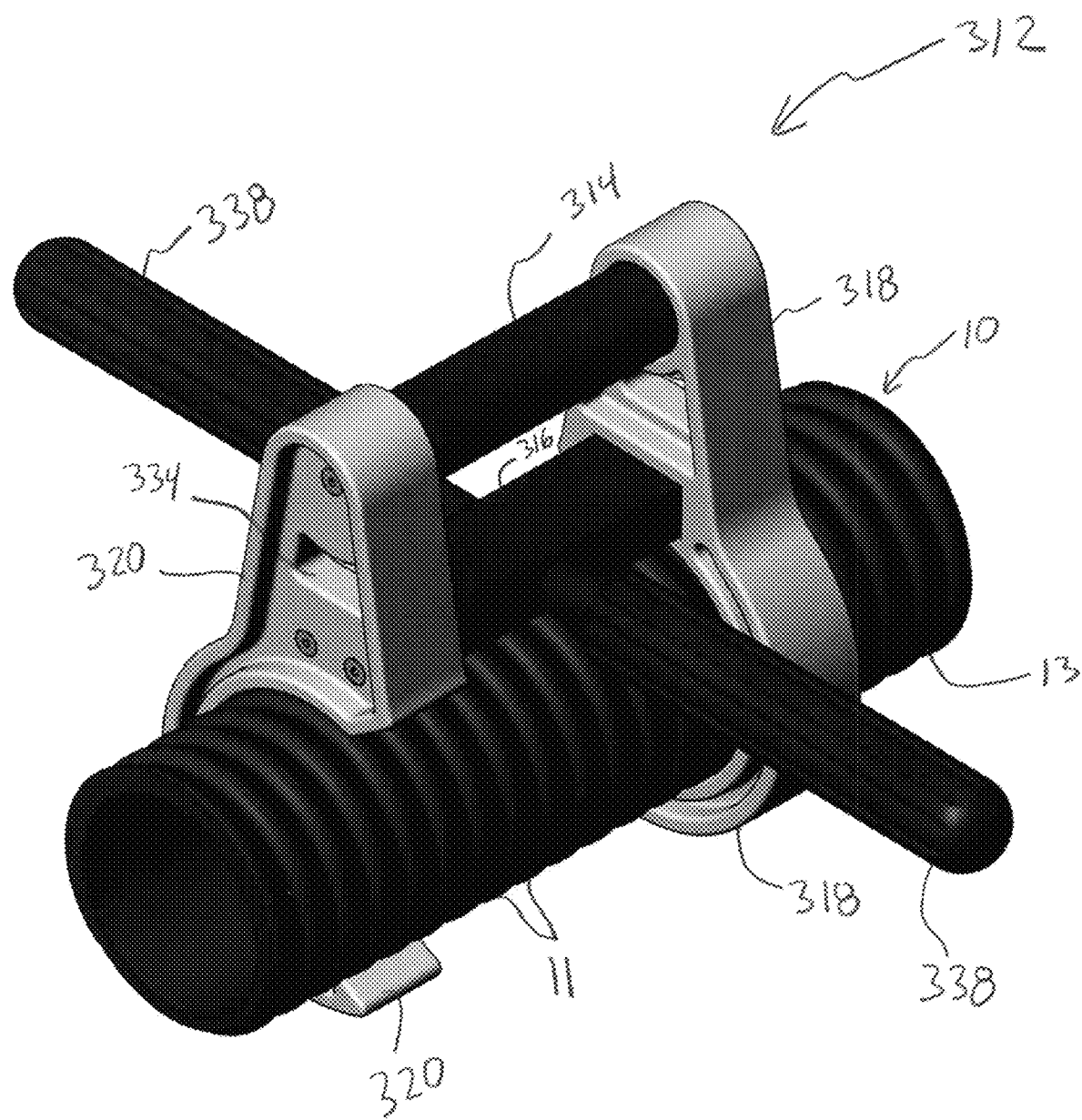
FIG. 9 is a perspective view of a corrugated pipe carrier with a perpendicular handle attached holding a corrugated pipe.

FIG. 9 illustrates the corrugated pipe carrier 312 with a perpendicular handle 338 attached. The perpendicular handle 338 threads into the opposing threaded holes 336 in the bridge 324. The perpendicular handle 338 facilitates carrying the corrugated pipe carrier 312. Additionally, for heavy corrugated pipe the perpendicular handle 338 makes for easier carrying by two people, one on either side of the corrugated pipe.

Figure 10:
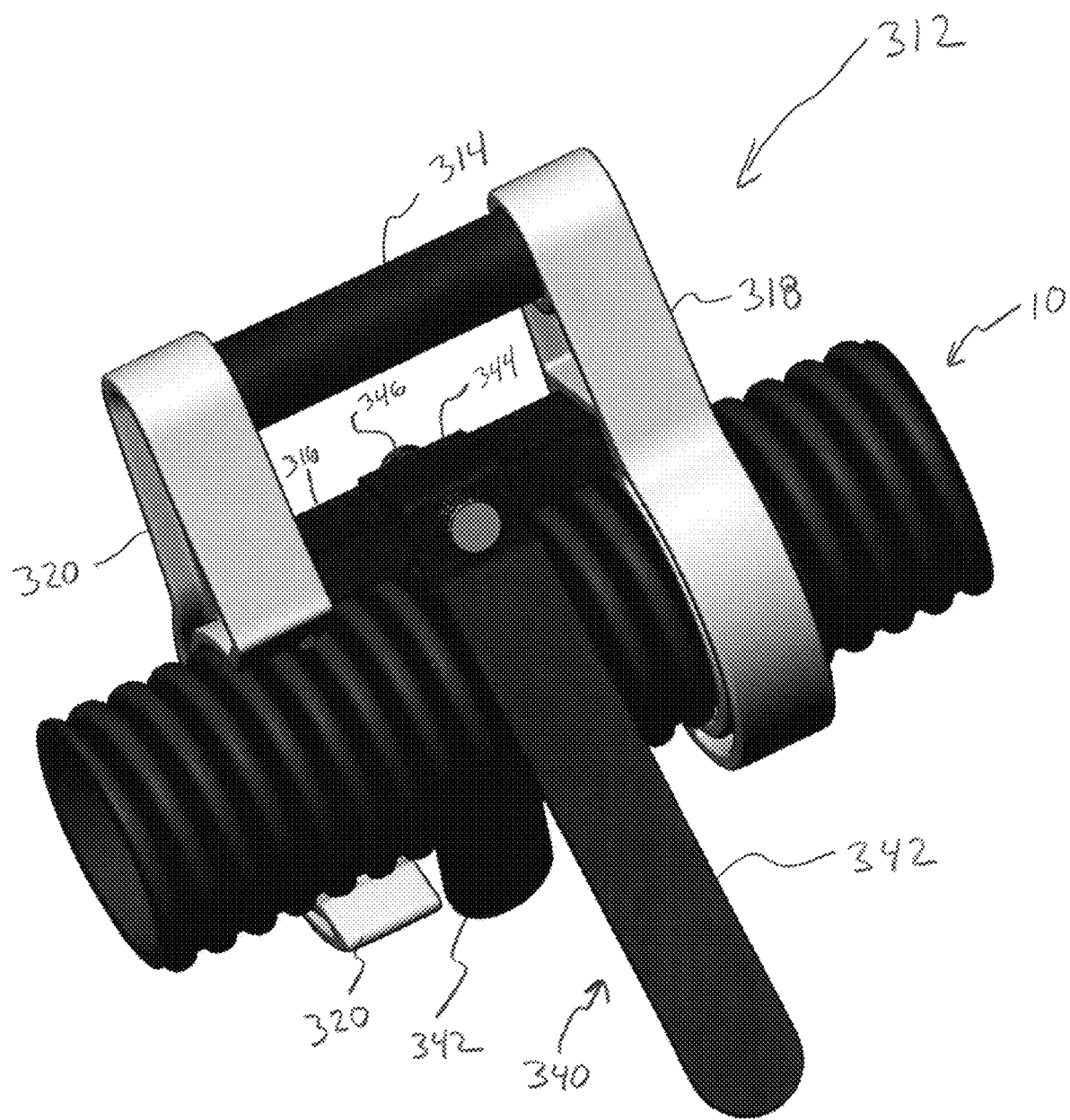
FIG. 10 is a view of the corrugated pipe carrier with a stand holding a corrugated pipe.

FIG. 10 illustrates the corrugated pipe carrier 312 with a stand 340 attached. The stand 340 is placed on the bridge 324 with bridge bracket 344 having holes aligned with the bridge threaded holes 336. Legs 342 extend from the bridge bracket 344 and prevent the corrugated pipe carrier 312 from tipping when placed on a surface or the ground. Thumbscrews 346 attached the bridge bracket 344 to the bridge 324.

Figure 11:
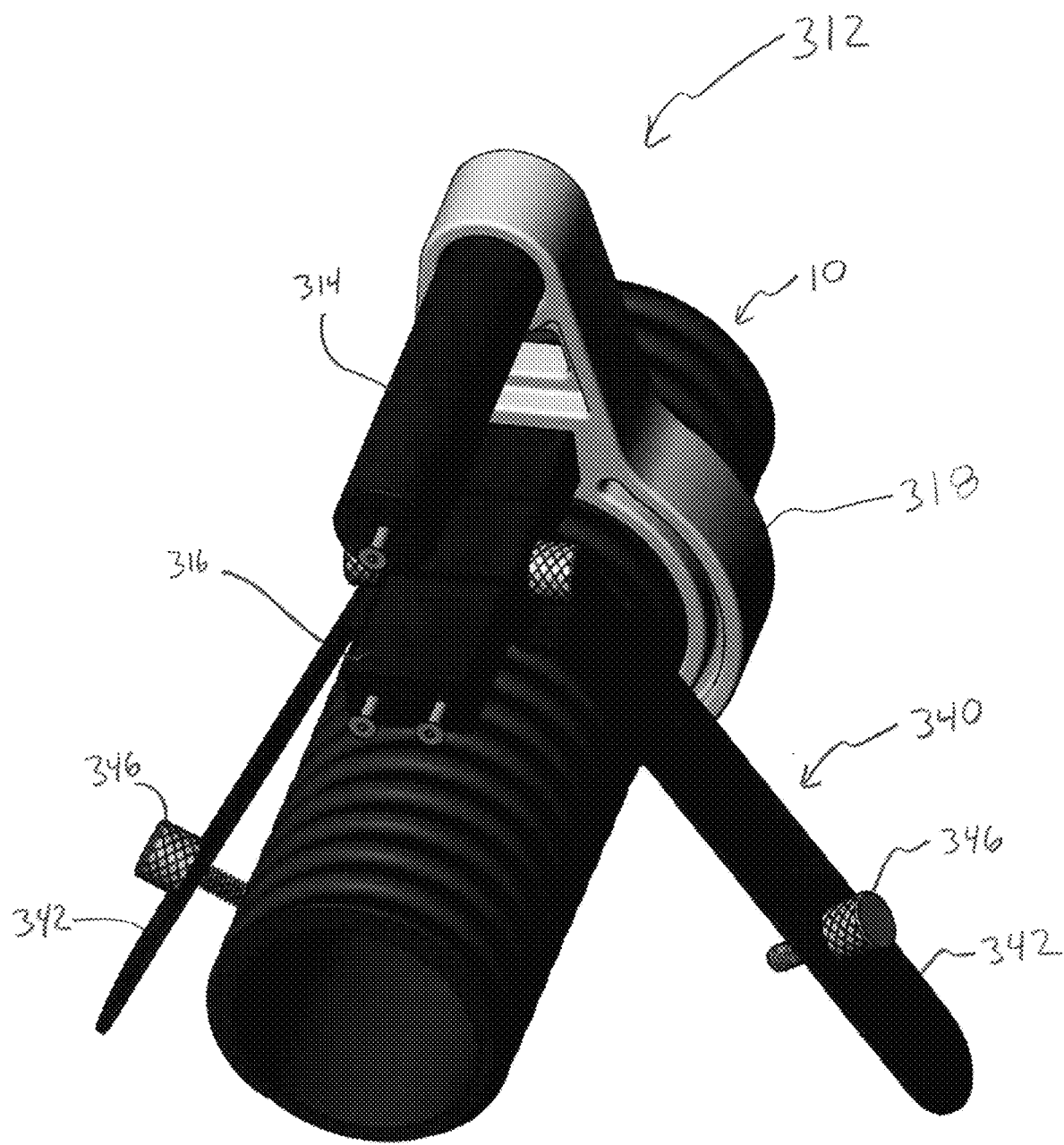
FIG. 11 his view of a corrugated pipe carrier with one curved grip removed.

FIG. 11 illustrates the corrugated pipe carrier 312 without the second curved grip 320. Each leg 342 may have a hole therein in which may be placed a spare thumbscrew 346. The hole in the leg 342 may also be used for storage of the thumb screw 346 when the stand 340 is not attached to the bridge 316 of the corrugated pipe carrier 312.

Figure 12:
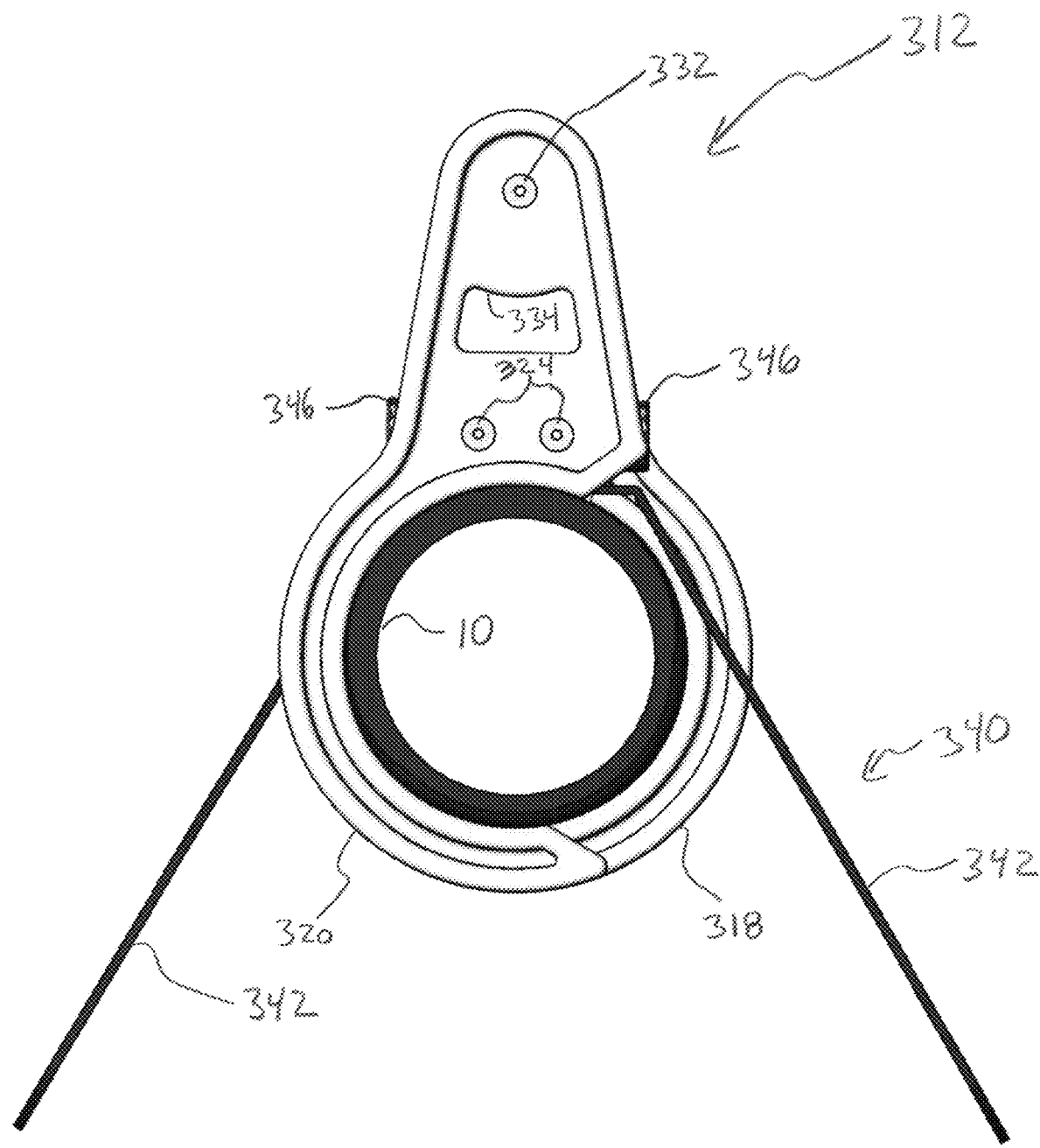
FIG. 12 is an elevational view of the corrugated pipe carrier with attached stand.

FIG. 12 is an end view of the corrugated pipe carrier 312 illustrating the stable position of the corrugated pipe carrier 312 with the legs 342 securely placed on the ground. The legs 342 prevent the corrugated pipe carrier 312 from falling over when placed on the ground. This assures that the handle remains upright to be easily grasped.

Figure 13:
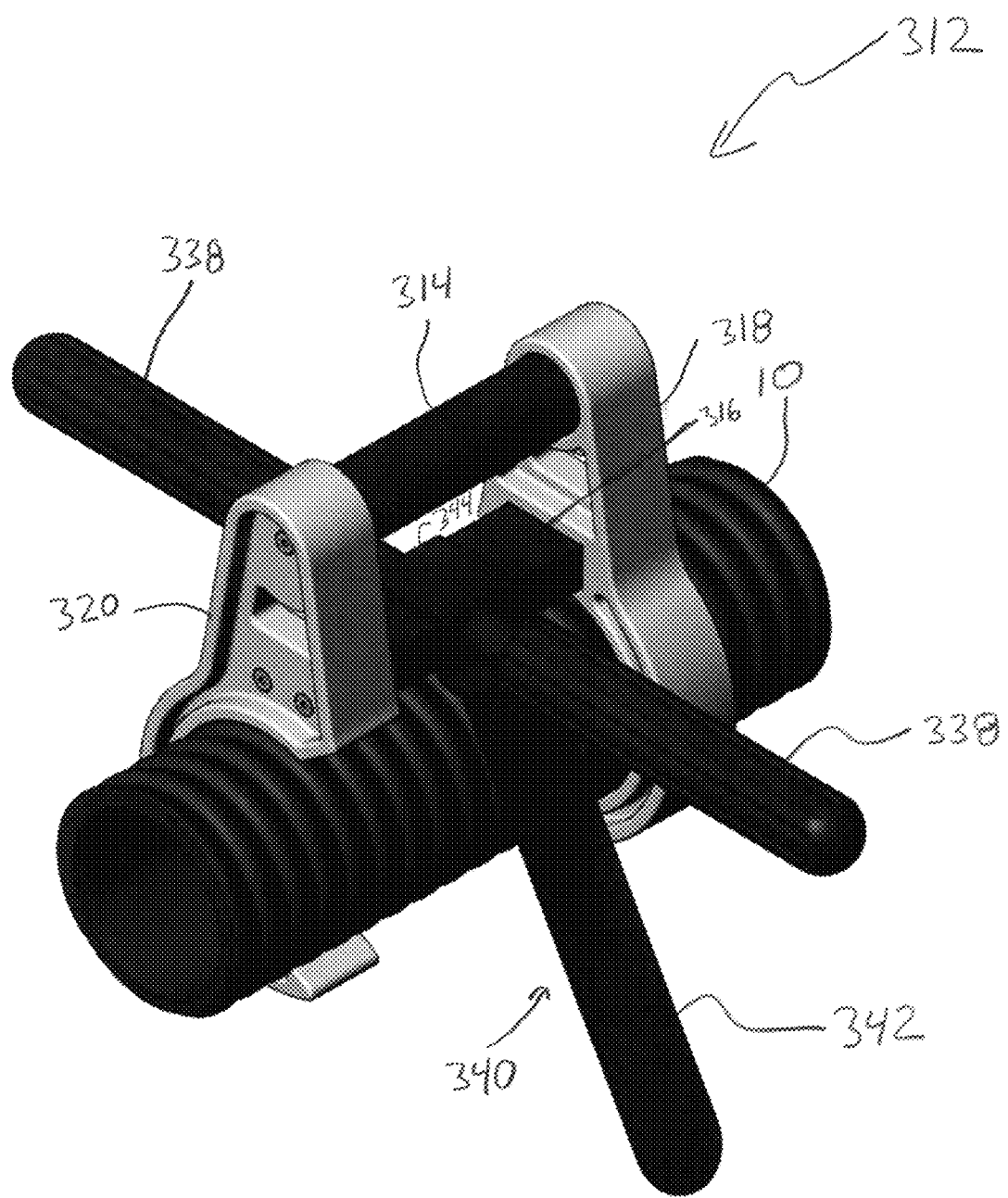
FIG. 13 is a perspective view of the corrugated pipe carrier with a perpendicular handle and a stand attached.

FIG. 13 illustrates the corrugated pipe carrier 312 holding the corrugated pipe 10 and with the perpendicular handles 338 and the stand 340 attached. The perpendicular handles 338 are attached through the bridge bracket 344 placed over the bridge 316 of the stand 340. This embodiment permits the corrugated pipe carrier 312 to be placed on the ground and easily picked up with the perpendicular handles 338.

Figure 14:
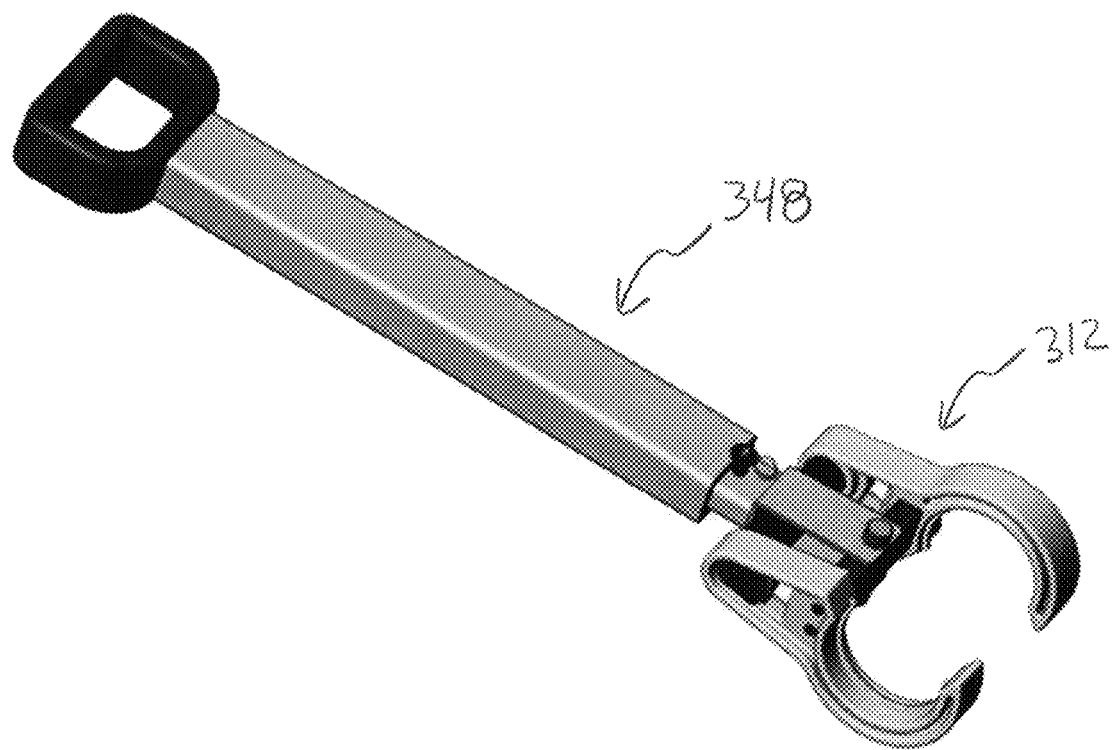
FIG. 14 illustrates the corrugated pipe carrier attached to a telescoping extension handle.

FIG. 14 illustrates the corrugated pipe carrier 312 removably attached to a telescoping extension handle 348. This permits corrugated pipe to be attached remotely with the use of the telescoping extension handle 348.

Figure 15:
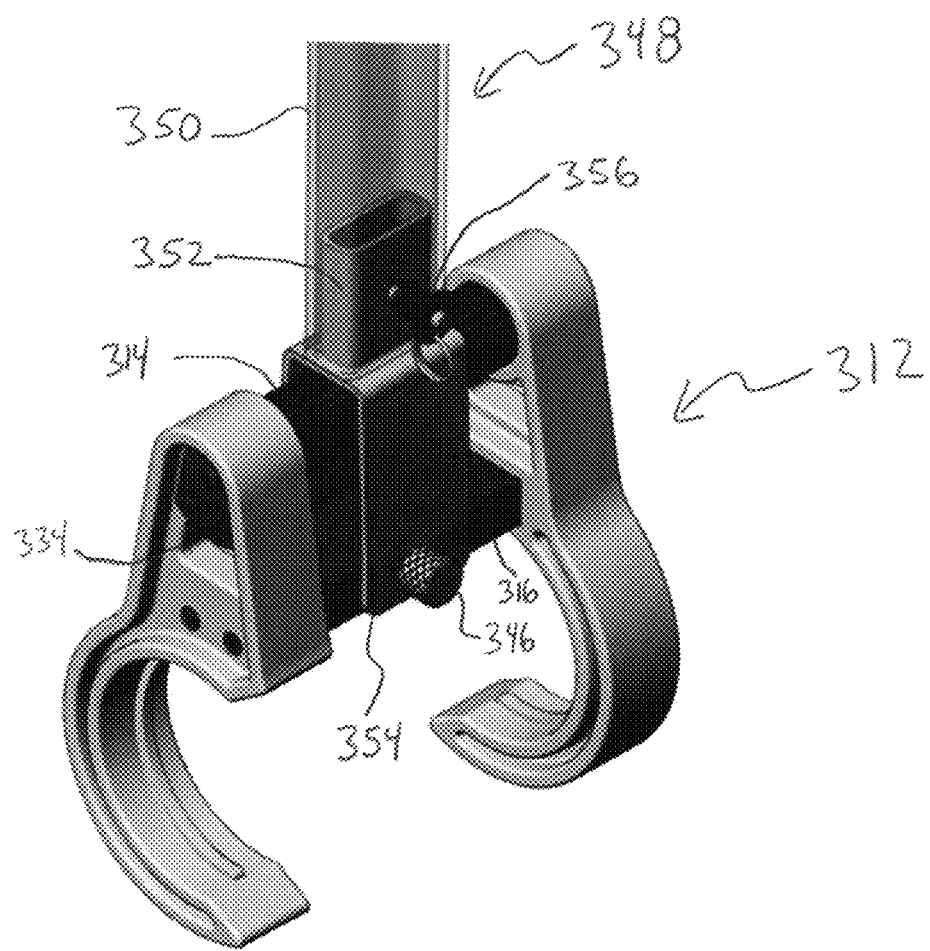
FIG. 15 illustrates the corrugated pipe carrier and a handle and bridge bracket for attaching the telescoping extension handle.

FIG. 15 more clearly illustrates the attachment of the telescoping extension handle 348 to the corrugated pipe carrier 312. Placed over the handle 314 and the bridge 316 is a handle and bridge bracket 354. Thumbscrew 346 attaches the bridge and handle bracket 354 to the bridge 316. At one the end of the bridge and handle bracket 354 is a telescoping rod insert 352. The telescoping rod insert 352 is placed within the telescoping rod 350. Removable pin 356 passes through a hole in the telescoping rod 350 and a hole in the telescoping rod insert 352 holding the telescoping extension handle 348 onto the handle and bridge bracket 354. The handle and bridge bracket 354 is positioned over and around the handle 314 and attaches to the bridge 316. The placement of the handle and bridge bracket 354 over the handle and attaching to the bridge 316 provides a strong attachment provides improved leverage between the handle 314 and the bridge 316 that permits better maneuvering, control, or handling of the corrugated pipe carrier 312 with just the telescoping extension handle 348. This makes the remote handling of a corrugated pipe easier.

Figure 16:
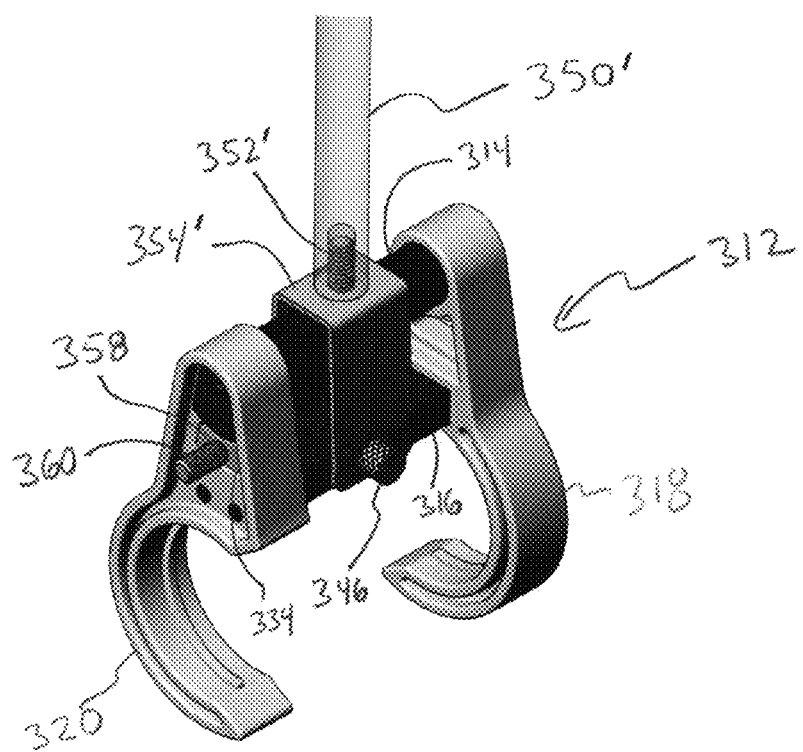
FIG. 16 illustrates another embodiment of the corrugated pipe carrier with a threaded extension handle attached.

FIG. 16 illustrates another embodiment of an extension handle 350' with a threaded hole attached to a handle and bridge bracket 354'. The handle and bridge bracket 354' has a threaded post 352' attached. Additionally, this embodiment has a short handle plug 358 fit within opening 334 in the second curved grip 320. The short handle plug 358 has a threaded post 360 thereon. This permits the extension handle 350' to be placed on the handle and bridge bracket 354' so as to extend perpendicular to the handle 314 or on the short handle plug 358 so as to extend parallel to the handle 314.

Figure 17:
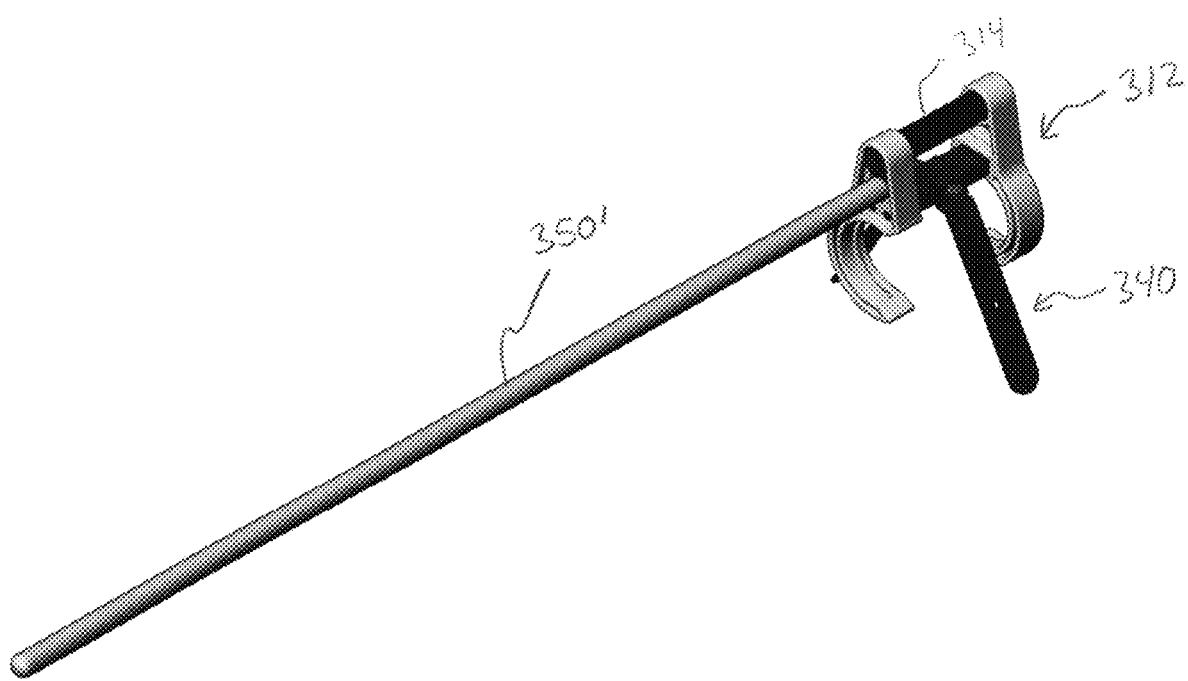
FIG. 17 illustrates another embodiment of the corrugated pipe carrier with a threaded extension handle attached on a side of the corrugated pipe carrier.

FIG. 17 illustrates an embodiment with the extension handle 350' attached to the corrugated pipe carrier 312 so that it is parallel with the handle 314. Stand 340 is also illustrated attached to the corrugated pipe carrier 312.

Figure 18:
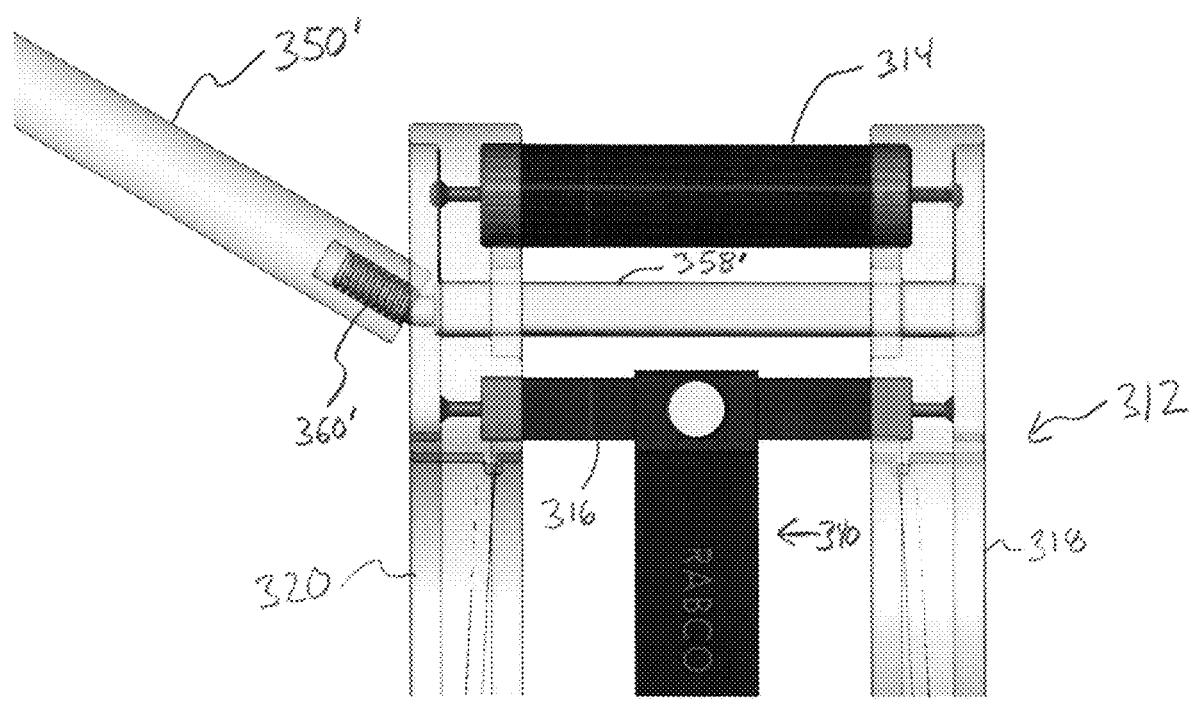
FIG. 18 illustrates another embodiment of the corrugated pipe carrier with a threaded extension handle attached angularly on the side of the corrugated pipe carrier.

FIG. 18 illustrates another embodiment with the extension handle 350' attached to a long handle plug 358' having an angled threaded post 360' relative to the longitudinal axis of the long handle plug 358'. In this embodiment the long handle plug 358' extends from first curved grip 318 to the second curved grip 320. The long handle plug 358' provides a stronger connection with the corrugated pipe carrier 312 and the extension handle 350'. Additionally, the extension handle 350' is placed at an angle relative to the handle 314 and an axis of a corrugated pipe providing easier grasping, carrying, or positioning in some applications.

The present invention makes picking-up, carrying, and positioning pipe much easier than previously possible. The present invention is particularly well suited to carrying, holding, and positioning large corrugated pipe.

The disclosed embodiments are only examples of the usefulness of the present invention wherein it will be appreciated by others skilled in the arts to apply the teachings of this invention in other ways. Additionally, although the preferred embodiments have been illustrated and described, it will be apparent to those skilled in the art that various modifications may be made without departing from the spirit and scope of this invention.

What is claimed is:

1. A pipe carrier for carrying corrugated pipe having grooves comprising:
   a handle having first and second opposing ends;
   a first curved grip attached to the first opposing end of said handle, said first curved grip having a first inner surface with first ridges adapted to mate with the grooves of the corrugated pipe and a first opening;
   a second curved grip attached to the second opposing end of said handle having a second inner surface with second ridges adapted to mate with the grooves of the corrugated pipe and a second opening and, wherein the first opening opposes the second opening;
   wherein the first and second curved grips are dimensioned to contact an external surface of the corrugated pipe with the first and second ridges mating with the grooves of the corrugated pipe;
   a bridge adjacent and parallel to said handle and extending between said first and second curved grips; and
   a stand having a pair of legs, said stand attached to said bridge wherein said bridge is placed between said pair of legs,
   whereby said pipe carrier is capable of attaching to the pipe and the pipe carried with said handle.

2. A pipe carrier for carrying corrugated pipe having grooves comprising:
   a handle having first and second opposing ends;
   a first curved grip attached to the first opposing end of said handle, said first curved grip having a first inner surface with first ridges adapted to mate with the grooves of the corrugated pipe and a first opening;

a second curved grip attached to the second opposing end of said handle having a second inner surface with second ridges adapted to mate with the grooves of the corrugated pipe and a second opening and, wherein the first opening opposes the second opening;

wherein the first and second curved grips are dimensioned to contact an external surface of the corrugated pipe with the first and second ridges mating with the grooves of the corrugated pipe;

a bridge adjacent and parallel to said handle and extending between said first and second curved grips;

a handle and bridge bracket placed over said handle and said bridge and attached to said bridge; and a rod insert attached to said handle and bridge bracket, whereby an extension handle is capable of being attached to said rod insert.

3. A pipe carrier for carrying corrugated pipe having grooves comprising:

a handle having first and second opposing ends;

a first curved grip attached to the first opposing end of said handle, said first curved grip having a first inner surface with first ridges adapted to mate with the grooves of the corrugated pipe and a first opening;

a second curved grip attached to the second opposing end of said handle having a second inner surface with second ridges adapted to mate with the grooves of the corrugated pipe and a second opening and, wherein the first opening opposes the second opening;

wherein the first and second curved grips are dimensioned to contact an external surface of the corrugated pipe with the first and second ridges mating with the grooves of the corrugated pipe;

a bridge adjacent and parallel to said handle and extending between said first and second curved grips;

said first and second curved grips each have an opening therein positioned between said handle and said bridge; and a plug having a post placed within one of the openings in said first and second curved grips, wherein a handle is capable of being attached to the post of said plug.

4. A pipe carrier for carrying corrugated pipe having grooves as in claim 3 wherein:

said plug is placed within and extending between each of the openings in said first and second curved grips.

* * * * *